April 25, 1961 L. S. SUOZZO 2,981,511
SWAY BRACE FOR PIPING
Filed May 20, 1959 2 Sheets-Sheet 1

INVENTOR.
LEONARD S. SUOZZO
BY
ATTORNEY

April 25, 1961 L. S. SUOZZO 2,981,511
SWAY BRACE FOR PIPING

Filed May 20, 1959 2 Sheets-Sheet 2

INVENTOR.
LEONARD S. SUOZZO
BY
ATTORNEY

United States Patent Office 2,981,511
Patented Apr. 25, 1961

2,981,511
SWAY BRACE FOR PIPING

Leonard S. Suozzo, Hackensack, N.J., assignor to Bergen Pipesupport Corp., New York, N.Y., a corporation of New York Filed May 20, 1959, Ser. No. 814,492

9 Claims. (Cl. 248—54)

This invention relates to the art of sway braces and in one of its more specific aspects, to an improved and simplified sway brace for effectively absorbing vibrational forces created in piping and the like during use.

The sway brace of this invention has wide application. It is especially useful as an adjunct to various piping systems, including those employed in land power plants, on sea-going vessels, in refineries and in various industrial plants. As is well known to the art, piping systems are subjected to stresses due to vibrations and oscillations which may be so serious as to damage the piping and/or equipment associated therewith unless adequate safeguards are provided for. The sway brace of this invention effectively and safely eliminates or compensates for vibrations and oscillations of the character indicated.

This invention constitutes a worthwhile advance in the art of sway braces in that it embodies several important features which contribute materially to its utility. Among such features are:

(1) The sway brace is very compact, thereby minimizing space requirements for installation and proper operation. Moreover, the sway brace is relatively simple and lightweight, resulting in substantial economies in manufacturing, transportation and handling costs.

(2) The sway brace includes a load adjusting means for varying the loading on resilient means and associated parts which are contained within a housing. The load adjusting means is positioned wholly within the housing and is protected against damage to its threads and other parts during handling and against tampering while in active use. The load adjusting means is accessible through a window which is provided in the housing. The window is preferably equipped with a removable cover plate to prevent entry of dust, dirt or other foreign material into the interior of the housing.

(3) The sway brace preferably includes a universal or swivel type connection that is secured to a wall of its housing and that is adapted to be connected to a support, such as a vertical building wall or column. This connection is preferably in the nature of a ball and socket joint and is so constructed and arranged as to afford adequate flexibility with minimum space requirement.

It is the principal object of the invention to provide a sway brace having improved features of design and construction.

Another object of the invention is to provide a sway brace including a housing and a load adjusting means which is positioned wholly within the housing, the housing being provided with a window which affords convenient access to the load adjusting means.

The invention has for a further object the provision of a sway brace that is simple and compact in design; that is lightweight, sturdy and durable in construction; that is reasonable in manufacturing cost; that is adapted to be readily adjusted prior to, during or subsequent to installation; and that is capable of performing its intended functions in an efficient and trouble-free manner.

The stated objects and other objects, together with the advantages of the invention, will be readily understood by persons skilled in the art from the following detailed description and the accompanying drawings which respectively describe and illustrate a sway brace embodying the invention.

In the drawings, wherein like reference numerals denote corresponding parts throughout the several views:

Fig. 1 is a view in central longitudinal cross-section of a sway brace constructed in accordance with the invention;

Fig. 2 corresponds to Fig. 1 and illustrates certain of the parts in another relative position;

Fig. 3 also corresponds to Fig. 1 and illustrates certain of the parts in still another relative position;

Figure 5:
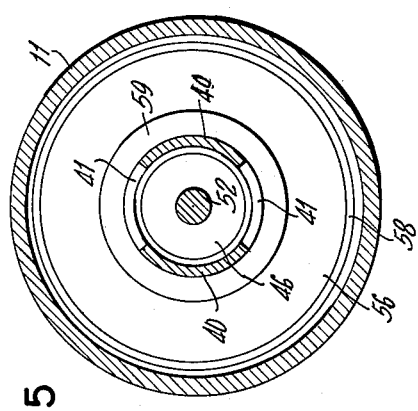
Fig. 5 is a view taken along line 5—5 of Fig. 1.

Referring initially to Fig. 1 of the drawing, there is illustrated a housing, generally denoted by numeral 10, which comprises a horizontally disposed tubular wall 11 and a pair of end walls 12 and 13. The tubular wall is welded to the end walls, as indicated at 12a and 13a, to obtain a rigid unitary structure.

Figure 4:
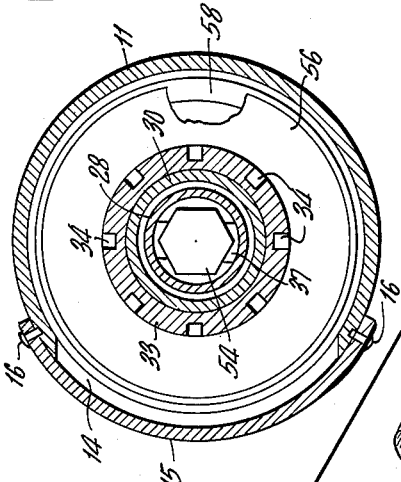
Fig. 4 is a view taken along line 4—4 of Fig. 1.

Tubular wall 11 is provided with an elongated transverse slot 14 which serves as a window to permit access to parts within the housing. A cover plate 15 (Fig. 4) is disposed over and across the slot and is removably secured to the housing tubular wall by screws 16.

End wall 12 has a tapped central through opening 17. End wall 13 has a central circular through opening 18.

The housing is adapted to be attached to a support, such as a vertical building wall or column (not shown), by a universal connector unit 20 which includes a mounting plate 21 having a plurality of drill holes 22 for receiving bolts or the like (not shown), whereby to secure the plate to the support. Welded to one side of plate 21, as indicated at 23, is a tubular socket 24 which forms a universal or swivel connection with spherical head 25 of a threaded rod 26. Rod 26 is threadedly connected to tapped opening 17 in wall 12. At the time of assembly, rod 26 is permanently joined to wall 12 by a weldment 27 to prevent movement of the rod relative to the housing.

A guide tube 28 is welded to the inner side of end wall 12, as indicated at 29. The guide tube is coaxial with rod 26 and opening 18.

Positioned within the housing is a spring mechanism which includes a pair of coaxial tubular members 30 and 31. Tubular member 30 is telescopically arranged over the guide tube and is provided with external threads 32 at one end to engage an internally threaded ring 33. This ring constitutes an adjusting member for varying the loading on spring means that will be described further along herein. The ring is provided with a plurality of circumferentially spaced blind bores 34 to receive a suitable tool for turning the same. Tubular member 30 is cut away at its other end to obtain a pair of diametrically opposed tongues 35 and a pair of diametrically opposed slots 36. A partition 37 is positioned within tubular member 30 and is affixed to its tongues in any desired manner known to the art, such as by welding. The partition has a central through opening 38 which is coaxial with the tubular members.

Tubular member 31 is also cut away at one end to obtain a pair of diametrically opposed tongues 40 and a pair of diametrically opposed slots 41. As will be noted from an examination of the drawings, the tongues of each tubular member register with corresponding slots of the other tubular member. The tongue and slot arrangement permits relative axial movement but prevents relative angular movement of the tubular members. Tubular member 31 is provided with an integral, external, annular flange 42 which is intermediate tongues 40 and the other end of that tubular member.

The sway brace includes a coupling unit 45 which is adapted to be connected to a load, such as a piping system. The coupling unit is in the nature of a plunger consisting of a part 46 of reduced diameter and a part 47 of enlarged diameter. The juncture of parts 46 and 47 forms an annular shoulder 48. Part 46 has a drill hole 50 while part 47 is tapped as indicated at 51. A threaded second rod 52 extends through plunger part 46 and is permanently secured to the plunger by a weldment 53. Rod 52 projects through partition opening 38 and is equipped with a head 54 which is disposed to the side of the partition remote from the plunger. Head 54 limits movement of the coupling unit relative to tubular member 30 toward the right, as viewed in Figs. 1, 2 and 3.

Figure 6:
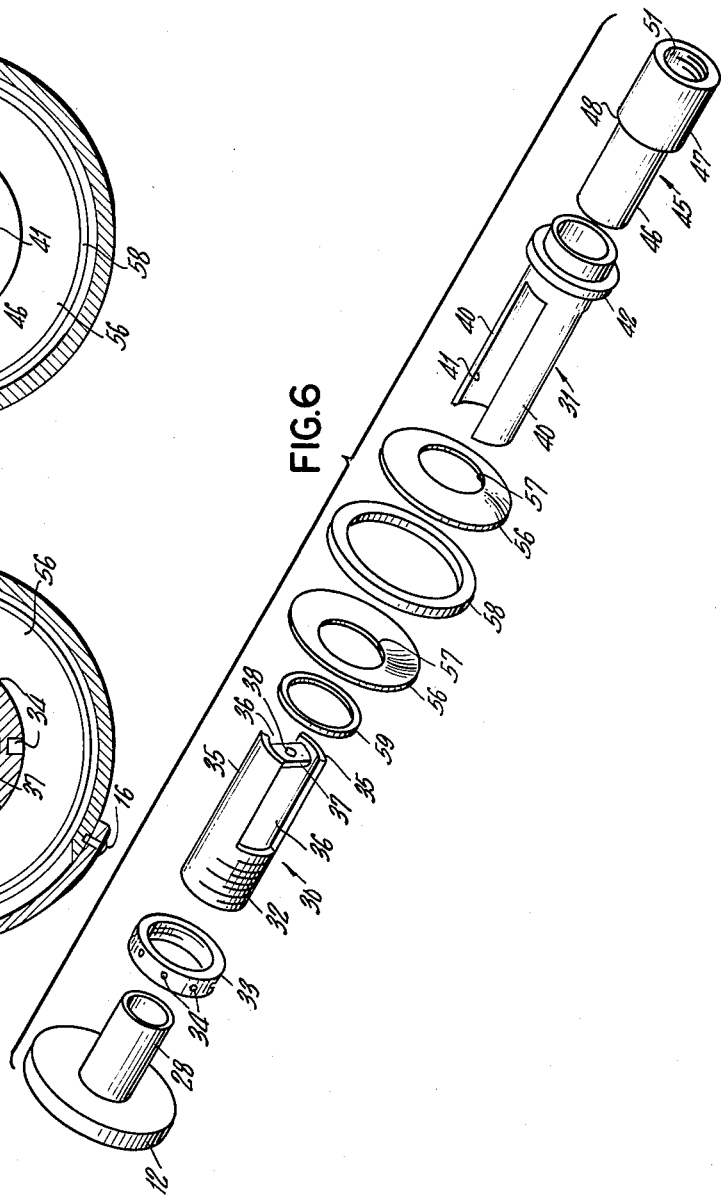
Fig. 6 is an exploded view of certain parts that are positioned in the housing of the sway brace shown in other views.

Positioned between adjusting member 33 and flange 42 is a plurality of spring units or assemblies 55. The number of spring units may be varied depending on the travel requirements of a particular sway brace. The spring units are coaxial with and guided by the tubular members. Each spring unit comprises a pair of oppositely disposed frusto-conical disc springs 56 having central through openings 57 (Fig. 6). Each disc spring is made of a suitable resilient metal and is substantially uniform in thickness. Each spring unit includes a means for maintaining the portions of largest diameter of corresponding disc springs in spaced relation. Such a means may comprise a spacing ring 58. Other means, including an integral spacer, as disclosed in my pending application Serial No. 574,534, may be used in lieu of spacing ring 58.

A spacing ring 59 is provided between each spring unit 55 and the next adjacent spring unit. Each of these rings bears against the portion of smallest diameter of pairs of disc springs, as shown in Figs. 1, 2 and 3. The illustrated arrangement of adjusting member 33, plunger flange 42, tubular members 30 and 31, disc springs 56 and spacing rings 58 and 59 permits the disc spring of each spring unit to be flexed beyond its flat position as will be apparent from an examination of the drawings and as is more fully explained in my said pending application Serial No. 574,534, to which reference may be had.

For the purpose of describing the operation of the illustrated form of the invention, it is assumed that the sway brace has been assembled and installed for active service with its mounting plate 21 secured to a stationary building support (not shown) and its plunger 45 connected to a piping system (also not shown). It is also assumed that spring units 55 are preloaded by turning adjusting ring 33 to the required extent relative to tubular member 30. It is further assumed that the parts are in the relative position shown in Fig. 1. With the parts in this position, the sway brace is not subjected to any appreciable external load since tubular member 30 bears against housing end wall 12, flange 42 bears against housing end wall 13 and plunger 45 bears against the outer end of tubular member 31. The tubular members are at their protracted relative travel limits with the parts as shown in Fig. 1.

When the sway brace is subjected to a force which moves the plunger toward the left as viewed in Fig. 1, the parts assume the relative position shown in Fig. 2. This results in further compression of the spring units and absorption of such force by the spring units. It will be observed that tubular member 31 has moved toward the left (Fig. 2) and that rod 52 and its head 54 have also moved toward the left, the head becoming disengaged from partition 37. Upon subsidence of the force, the parts return to the relative position shown in Fig. 1.

When the sway brace is subjected to a force which moves the plunger toward the right as viewed in Fig. 1, certain parts will be correspondingly moved toward the right and attain the relative position shown in Fig. 3. With the parts in this position, flange 42 bears against housing end wall 13 and tubular member 30 is moved toward the right by rod head 54 acting on partition 37. When the force subsides, the parts return to the relative position shown in Fig. 1.

From the foregoing, it is believed that the construction, operation and advantages of my present invention will be readily comprehended by persons skilled in the art. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. In a sway brace, a housing including a wall having a through opening formed therein, a guide member positioned in and secured to the housing, said guide member being spaced from said wall and aligned with said opening, a first tubular member coaxial with and slidable along the guide member, a second tubular member coaxial with the guide member and the first tubular member, means permitting relative axial movement but preventing relative angular movement of the tubular members, a partition within the first tubular member, a coupling unit comprising a plunger slidable in the second tubular member and through said opening, a rod affixed to and extending beyond one end of the plunger and means carried by the rod and engaging the side of the partition which is remote from the plunger, and resilient means normally and yieldingly biasing the tubular members for movement in opposite directions.

2. In a sway brace, a housing including a wall having a through opening formed therein, a guide member positioned in and secured to the housing, said guide member being spaced from said wall and aligned with said opening, a first tubular member coaxial with and slidable along the guide member, a second tubular member coaxial with the guide member and the first tubular member, means permitting relative axial movement but preventing relative angular movement of the tubular members, means within the housing limiting axial movement of the first tubular member in one direction and the second tubular member in the opposite direction, a partition within the first tubular member, a coupling comprising a plunger unit slidable in the second tubular member and through said opening, a rod affixed to and extending beyond one end of the plunger and means carried by the rod and engaging the side of the partition which is remote from the plunger, and resilient means normally and yieldingly biasing the tubular members for movement in opposite directions.

3. In a sway brace, a housing including a wall having a through opening formed therein, a guide member positioned in and secured to the housing, said guide member being spaced from said wall and aligned with said opening, a first tubular member coaxial with and slidable along the guide member, a second tubular member coaxial with the guide member and the first tubular member, means permitting relative axial movement but preventing relative angular movement of the tubular members, a partition within the first tubular member, a coupling unit comprising a plunger slidable in the second tubular member and through said opening, a rod affixed to and extending beyond one end of the plunger and means carried by the rod and engaging the side of the partition which is remote from the plunger, and resilient means normally and yieldingly biasing the tubular members for movement in opposite directions, said coupling unit being adapted on movement of the plunger in one direction to move the first tubular member toward the second tubular member against the action of the resilient means, said coupling unit being adapted on movement of the plunger in a reverse direction to move the second tubular member toward the first tubular member against the action of the resilient means.

4. In a sway brace, a housing including a wall having a through opening formed therein, a guide member positioned in and secured to the housing, said guide member being spaced from said wall and aligned with said opening, a first tubular member coaxial with and slidable along the guide member, a second tubular member coaxial with the guide member and the first tubular member, means permitting relative axial movement but preventing relative angular movement of the tubular members, means within the housing limiting axial movement of the first tubular member in one direction and the second tubular member in the opposite direction, a partition within the first tubular member, a coupling unit comprising a plunger slidable in the second tubular member and through said opening, a rod affixed to and extending beyond one end of the plunger and means carried by the rod and engaging the side of the partition which is remote from the plunger, and resilient means normally and yieldingly biasing the tubular members for movement in opposite directions, said coupling unit being adapted on movement of the plunger in one direction to move the first tubular member toward the second tubular member against the action of the resilient means, said coupling unit being adapted on movement of the plunger in a reverse direction to move the second tubular member toward the first tubular member against the action of the resilient means.

5. A sway brace according to claim 4 wherein the resilient means comprises at least one disc spring which has a central through opening and which is substantially coaxial with the tubular members.

6. A sway brace according to claim 4 including adjusting means connected to one of the tubular members and bearing against the resilient means for varying the loading on the resilient means.

7. A sway brace according to claim 4 including adjusting means threadedly connected to one of the tubular members and positioned wholly within the housing for varying the loading on the resilient means, the housing being provided with a window, the adjusting means being accessible through the window.

8. A sway brace according to claim 4 wherein the resilient means comprises at least one disc spring which has a central through opening and which is substantially coaxial with the tubular members, the sway brace also including adjusting means threadedly connected to one of the tubular members and positioned wholly within the housing for varying the loading on the resilient means, the housing being provided with a window, the adjusting means being accessible through the window.

9. In a sway brace, a housing including spaced first and second end walls, said second end wall having a through opening, a guide member positioned within the housing and secured to the first end wall, said guide member being spaced from the second end wall and axially aligned with said opening, a first tubular member coaxial with and slidable along the guide member, a second tubular member coaxial with the guide member and the first tubular member, means permitting relative axial movement but preventing relative angular movement of the tubular members, a partition within the first tubular member, a coupling unit comprising a plunger slidable in the second tubular member and through said opening, a rod affixed to and extending beyond one end of the plunger and means carried by the rod and engaging the the side of the partition which is remote from the plunger, and resilient means normally and yieldingly biasing the tubular members for movement in opposite directions.

References Cited in the file of this patent

UNITED STATES PATENTS

| | | |
|---|---|---|
| 2,540,525 | Howarth | Feb. 6, 1951 |
| 2,908,491 | Suozzo | Oct. 13, 1959 |